United States Patent [19]

Watson

[11] Patent Number: 4,830,333

[45] Date of Patent: May 16, 1989

[54] SOLENOID VALVE

[75] Inventor: Richard D. Watson, Anderson, Ind.

[73] Assignee: General Motors Corporation, Detroit, Mich.

[21] Appl. No.: 240,023

[22] Filed: Sep. 2, 1988

[51] Int. Cl.⁴ .................. F16K 31/06; H01F 7/08
[52] U.S. Cl. .............................. 251/129.18; 335/273
[58] Field of Search ............. 251/129.15, 129.18; 335/273

[56] References Cited

U.S. PATENT DOCUMENTS

| 1,822,668 | 9/1931 | Protzeller | 251/129.18 |
| 2,147,945 | 2/1939 | Hann et al. | 251/129.18 |
| 2,955,240 | 10/1960 | Gardner | 335/273 |
| 3,429,552 | 2/1969 | Huley et al. | 251/129.18 |
| 3,480,040 | 11/1969 | Erickson | 251/129.15 |
| 4,463,332 | 7/1984 | Everett | 335/273 |
| 4,614,328 | 9/1986 | Zeadman et al. | 251/129.18 |
| 4,630,799 | 12/1986 | Nolan et al. | 251/129.18 |
| 4,635,683 | 1/1987 | Nielsen | 251/129.18 |
| 4,637,429 | 1/1987 | Dietiker et al. | 251/129.18 |
| 4,640,391 | 2/1987 | Maehara et al. | 251/129.14 |

FOREIGN PATENT DOCUMENTS

| 698160 | 11/1964 | Canada | 251/129.18 |
| 2559323 | 7/1977 | Fed. Rep. of Germany | 251/129.18 |

Primary Examiner—George L. Walton
Attorney, Agent, or Firm—C. R. Meland

[57] ABSTRACT

A solenoid operated fluid control valve. The control valve has a plastic housing that supports a coil winding. A valve plunger and a stop member both of which are formed of magnetic material carry magnetic flux developed by energization of the coil winding. Opposed end faces of the plunger and stop member are spaced from each other to form an air gap that is traversed by the magnetic flux. The length of the air gap can be adjusted. To accomplish this, the stop member has a threaded portion that is threaded into a portion of the plastic housing. A cap member, formed of plastic material, is provided that is coupled to the stop member in a manner that prevents relative rotation between the cap member and stop member. After the air gap is adjusted, the cap member is ultrasonically welded to the housing.

6 Claims, 1 Drawing Sheet

SOLENOID VALVE

This invention relates to solenoid operated fluid control valves and more particularly to a solenoid valve that is provided with means for adjusting its operating characteristic.

One of the objects of this invention is to provide an improved solenoid valve that includes means for adjusting the operating characteristic of the solenoid valve so that after adjustment the solenoid valve will have a predetermined precision operating characteristic. More specifically, the solenoid valve of this invention includes a coil winding that is encapsulated with plastic material that forms an outer plastic housing. The solenoid valve has a reciprocable magnetic valve plunger and a stop member that is formed of magnetic material. The valve plunger and stop member are located within the coil winding and opposed end faces of the plunger and stop member are separated to provide an air gap. When the coil winding is energized, it generates magnetic flux that passes through or traverses the air gap. The length of the air gap can be adjusted. The adjustment of the air gap is accomplished by providing the stop member with a threaded portion that is threaded into a portion of the plastic housing. Accordingly, as the stop member is rotated it is moved axially to vary the length of the air gap. After the stop member has been rotated to an adjusted position it is fixed from rotation by a cap member which can be formed of plastic material. The cap member has a hexagonal portion that is located in a complementary hexagonal bore formed in the stop member. When the air gap has been adjusted to the desired length, the cap member is assembled to the stop member and the cap member is then welded to the housing to thereby fix the cap member and stop member from rotation and from any further adjustment.

The air gap is adjusted in a manner that has been described, while the solenoid valve is controlling fluid flow in a manner that simulates actual operating conditions of the valve. Thus, when the air gap is being adjusted, the coil winding is energized with pulse-width modulated direct current and the amount of fluid flow is measured. The air gap is adjusted until the desired amount of fluid flow is attained.

Another object of this invention is to provide a solenoid valve, of the type described, that has sealing means for excluding salt spray, water and other contaminants from entering the solenoid valve. More specifically, the weld between the cap member and housing serves as a secondary sealing means. A primary seal is provided by an elastomeric O-ring that is compressed between a portion of the housing and a portion of the cap member.

IN THE DRAWINGS

Figure 1:
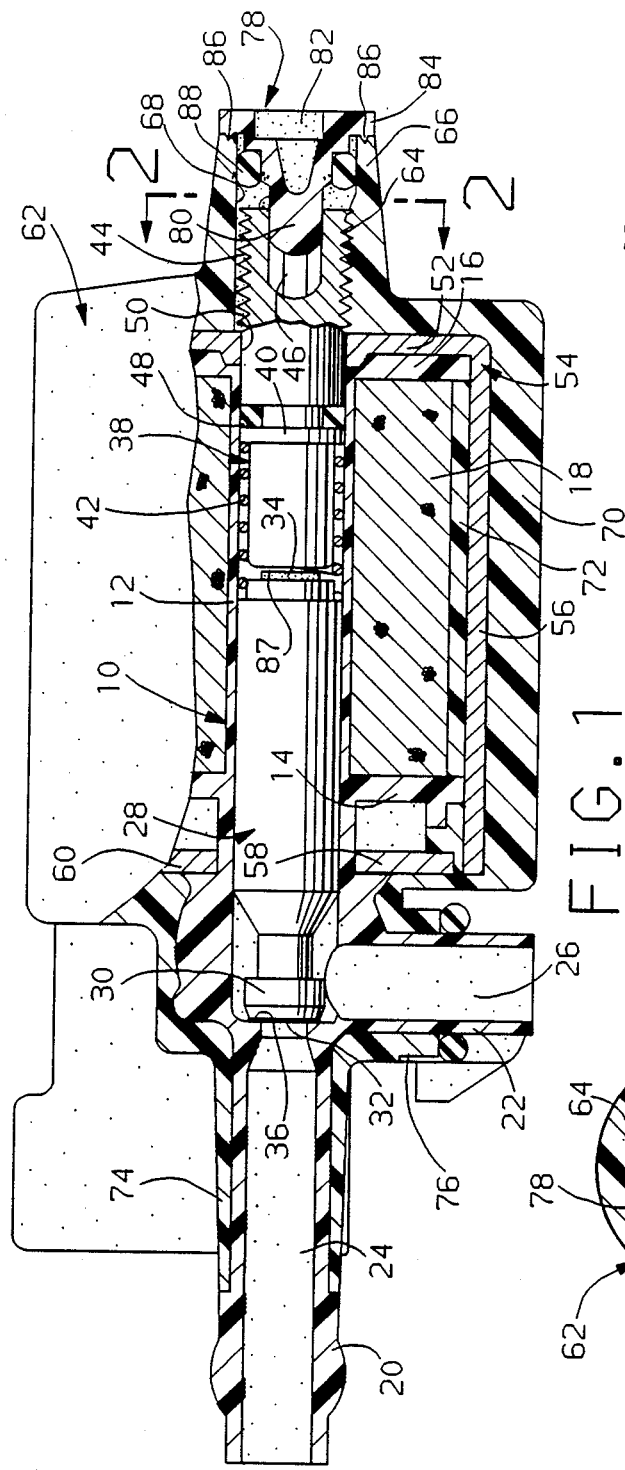
FIG. 1 is a view, partly in section, illustrating a solenoid valve made in accordance with this invention.

Referring now to the drawings, the solenoid valve of this invention comprises a one-piece molded part generally designated by reference numeral 10 which is formed of a molded plastic material. The part 10 has a tubular portion 12 and a pair of annular walls 14 and 16. The outer surface of tubular portion 12 and the walls 14 and 16 form a coil spool which supports a coil winding 18 that is formed of a plurality of turns of wire. The internal surface of portion 12 supports a stop member, which will be described. The part 10 has tubular pipe or conduit portions 20 and 22 which define passages 24 and 26. As will be more fully described hereinafter, passage 24 is adapted to be connected to a source of vacuum such as the intake of an internal combustion engine and passage 26 is adapted to be connected to a charcoal canister.

The tubular portion 12 of part 10 slidably supports a valve plunger 28 that is formed of steel. Since plunger 28 is formed of steel, it is formed of a magnetic material. The valve plunger 28 has a valve head 30 that carries an annular part 32 that is formed of rubber. The other end of plunger 28 carries another annular part 34 which is formed of rubber and which operates as a bumper. The parts 32 and 34 can be formed by molding rubber to an axially extending internal bore (not illustrated) that extends entirely through plunger 28. The parts 32 and 34 are joined by the portion of the rubber material that is located in the bore of plunger 28. The part 32 cooperates with an annular valve seat 36. When part 32 engages valve seat 36 the valve is closed so that there will be no flow between passages 24 and 26.

The internal surface of tubular portion 12 supports a stop member 38 that is formed of steel. Since stop member 38 is formed of steel it is formed of a magnetic material. The stop member 38 has an annular flange 40. A compression spring 42 is interposed between the flange 40 and an annular surface on plunger 28. The spring 42 urges or forces the valve to a closed position, that is, it forces plunger 28 to a position where part 32 engages valve seat 36.

The stop member 38 has an integral externally threaded portion 44 and a bore 46 that is hexagonally shaped in cross section. The threaded portion 44 can be formed as a 5/16-32 UNEF-2A thread. The stop member 38 has an annular groove that accommodates an elastomeric O-ring seal 48. The seal 48 engages the internal surface of tubular portion 12.

A portion of the stop member 38 is disposed within an opening 50 formed in an end wall 52 of a steel part 54. The part 54 has two axially extending and circumferentially spaced straps, one of which is shown in FIG. 1 and identified by reference numeral 56. The part 54 being formed of magnetic material (steel) forms part of a magnetic circuit for the flux developed by coil 18. The magnetic circuit for the solenoid valve further includes steel parts 58 and 60. Steel part 58 may be generally U-shaped and can have an internal arcuate wall. Although only one steel part 60 is shown it is preferred that two steel parts 60 be used which abut each other. The steel parts 60 are semi-circular. The parts 58 and 60 cooperate with the two straps, like strap 56, to form a magnetic circuit.

The outer housing of the solenoid valve, which has been generally designated by reference numeral 62, is formed of a thermoplastic material such as 13% glass filled nylon. The outer housing 62 is molded to the internal parts that have been described and it encapsulates these parts. During this overmolding operation a pin is inserted into the bore of tubular portion 12 to prevent collapsing of the spool portion of part 10. This pin is shaped such that during the molding operation, three radially inwardly extending lobes 64 are formed. The outer housing 62, after being molded to shape, includes the tubular portion 66 having a bore 68, outer wall 70, portion 72 and outer portions 74 and 76 disposed respectively about conduit or pipe portions 20 and 22 of part 10.

Figure 2:
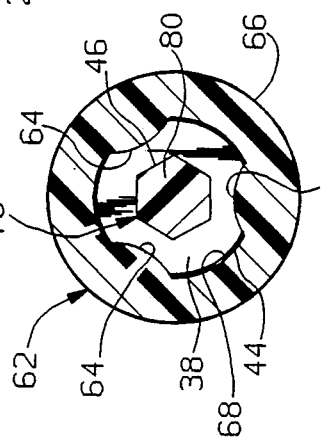
FIG. 2 is a sectional view taken along line 2—2 of FIG. 1.
Figure 3:
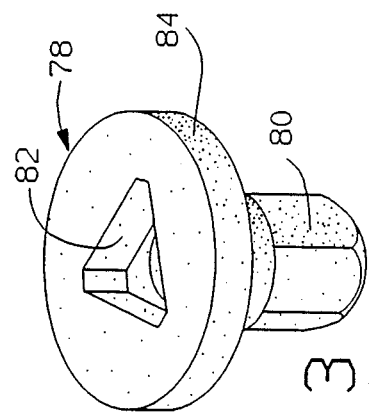
FIG. 3 is a perspective view of a cap member that is used in the solenoid valve shown in FIG. 1.

The solenoid valve has an end cap generally designated by reference numeral 78, which is shown in FIG. 2 and in the perspective view of FIG. 3. The end cap 78 is formed of a plastic material and can be formed of the same material as outer housing 62 (13% glassed filled nylon). The end cap 78 has a hexagonal stud portion 80 which is complementary to the hexagonal bore 46 of the stop 38. The part 78 further has a triangular-shaped bore 82 and an annular portion 84. The cap 78 has an annular V-shaped portion 86 which is shown in FIG. 1.

The intended use for the solenoid valve, that has been described, is in an evaporative emission control system for a motor vehicle. In such a system, fuel vapor from the vehicle fuel tank is supplied to a charcoal canister. This vapor is purged from the canister by connecting the canister to the intake manifold or intake side of an inernal combustion engine. The solenoid valve of this invention controls the amount of flow between the canister and the engine. Thus, the pipe or conduit 20 is connected to the intake of the engine and pipe or conduit 26 is connected to the canister. The passage 24 is accordingly connected to a vacuum and causes vapor to be pulled into the engine by control of valve plunger 38. During use, the coil 18 is supplied with a pulse-width modulated direct current having a variable duty cycle. This causes the valve to open and close at the frequency of the pulse-width modulated direct current and the relative time periods that the valve is open and closed depends upon the duty cycle. As duty cycle increases, the amount or volume of flow per unit time will increase and vice-versa.

The purpose of stop 38 and end cap 78 and how they are assembled to housing 62 will now be described. When the stop 38 is assembled into the tubular portions 12 and 66, it is rotated to cause the threaded portion 44 to cut or roll threads into the three lobes 64. The stop 38 now has a threaded connection with tubular portion 66 so that rotation of stop 38 will cause it to move axially in tubular portion 12 of part 10. It can be seen in FIG. 1 that there is an air gap 87 between the right end face of plunger 28 and the left end face of stop 38. The air gap 87 is adjustable and may be in a range of about 0.032 inches. The flux generated by coil 18 passes axially through plunger 28 and stop 38 and passes through the air gap 87. Further, there is a gap between the end face of rubber part 34 and the end face of stop 38 which may be about 0.012 inches. The gaps that have been described are both adjustable as to length by rotating stop 38.

The air gap 87 that has been described is adjusted by rotation of stop 38. When it is desired to adjust stop 38 an adjusting tool (not illustrated), which has a hexagonal portion, is moved into the complementary hexagonal bore 46 of stop 38. Accordingly, rotation of the tool will now rotatably drive stop 38. As stop 38 rotates, the threaded portion 44 causes the stop 38 to move axially to adjust the air gap 87 that has been described.

In order to set the air gap 87, the passage 24 is connected to a source of vacuum and the coil 18 is energized with a pulse-width modulated current at a duty cycle of, for example, 30%. When coil 18 is energized, the flux developed will cause plunger 28 to move to a position where rubber bumper 34 engages the end face of stop 38. When coil 18 is deenergized, the spring 42 forces the plunger 28 to a position where rubber part 32 engages valve seat 36. The amount of flow from passage 26 to passage 24 is now measured as the stop 38 is rotated to adjust the air gap. When the amount of flow is equal to a desired amount, the rotation of stop 38 is stopped or terminated. After stop 38 has been adjusted the cap 78 and elastomeric O-ring 88 are assembled. This is accomplished by inserting hexagonal stud portion 80 into hexagonal bore 46 of stop 38. The cap 78 is now ultrasonically welded to the end of tubular portion 66 of housing 62. This weld is between the end face of tubular portion 66 and end face of annular portion 84 and the weld is formed by the melting of engaged portions of the end faces. The weld is a continuous annular weld. This ultrasonic weld positively locks the cap 78 to housing 62 and this positive lock serves to positively lock the stop 38 in place. In this regard, when hexagonal stud 80 is inserted into hexagonal bore 46, stop 38 and cap 78 cannot rotate relative to each other. This, of course, prevents the air gap 87 from varying during use of the solenoid valve. The ultrasonic weld also forms a seal or barrier to prevent salt spray, water and the like from entering the solenoid valve. The V-shaped portion 86 of cap 78 is used as an aid for the ultrasonic welding.

In regard to the adjusting of the air gap, it will be appreciated that the spring 42 forces the valve closed and that the magnetic force developed to open the valve against the force of the spring will depend upon the length of the air gap 87. Further, the adjustment of stop 38 sets a limit as to how far the valve can open, that is, plunger 28 is stopped in its movement when rubber bumper 34 engages the end face of stop 38. The adjustment of stop 38 compensates for differences or variations in the response characteristic of the solenoid valve that may occur from one solenoid valve to another solenoid valve during the manufacture of the solenoid valve.

The purpose of O-ring 88 is to provide a primary seal. Thus, in most cases, the welding of cap 78 to tubular portion 66 will provide a continuous seal. However, in the event that the weld is not entirely continuous the O-ring seal 88 will prevent entry of unwanted substances. It can be seen, in FIG. 1, that the O-ring seal 88 is tightly compressed between a portion of cap 78 and an internal surface of tubular portion 66.

The bore 82 of cap 78 is adapted to receive a tool for applying torque to cap 78 after it is welded to the end of tubular portion 66. Torque is applied to test the strength of the weld.

The embodiments of the invention in which an exclusive property or privilege is claimed are defined as follows:

1. A solenoid operated control valve comprising, a housing formed of plastic material having a tubular portion, a coil winding supported by said housing having an internal bore, a control valve comprising a valve plunger disposed within said bore, an adjustable stop member formed of magnetic material having a portion thereof disposed within said bore, said valve plunger and stop member having opposed spaced end faces that define an air gap, said coil winding when energized generating magnetic flux that traverses said air gap, said stop member having an integral external threaded portion that is threaded into internal wall means of said tubular portion of said housing for adjustably setting said air gap, a cap member formed of plastic material closing an open end of said tubular portion of said housing after said air gap has been adjusted to the required setting, and coupling means comprising complimentay telescoped wall means on said cap member and said stop member for connecting said cap member and said stop member operative to prevent relative rotation between said stop member and said cap member, said cap member being welded to said tubular portion of said housing by a substantially continuous weld that is operative to prevent rotation of said cap member relative to said housing an operative to provide a seal.

2. The control valve according to claim 1 where the coupling means comprises a bore in said stop member and where said cap member has a portion thereof located in the bore in said stop member, the bore in said stop member being defined by at least one flat wall and said portion of said cap member having at least one flat wall that engages the flat wall in the bore in said stop member.

3. The control valve according to claim 1 where an elastomeric O-ring is compressed between an internal wall of said tubular portion of said housing and a portion of said cap member.

4. A solenoid operated control valve comprising, a housing, a coil winding supported by said housing having a central bore, said housing having a tubular portion, a control valve comprising a valve plunger formed of magnetic material disposed within said central bore, said valve plunger having valve means that engages a valve seat in a closed position of the valve, means supporting said valve plunger for reciprocable movement in said central bore, a stop member supported by said housing formed of magnetic material and disposed within said central bore, said stop member being axially aligned with said valve plunger, said valve plunger and stop member having opposed spaced end faces that define an air gap, said coil when energized developing magnetic flux that traverses said air gap, a spring engaging said valve plunger operative to force said valve means against said valve seat to close the valve, said valve plunger being shifted against the force of said spring to a position wherein said valve means moves away from said valve seat to open the valve when said coil winding is energized, said valve plunger having means engaging said end face of said stop member when said coil winding is energized to limit the opening movement of the valve plunger, said stop member having a threaded portion that is threaded to internal wall means of said tubular portion of said housing whereby rotary movement of said stop member causes said stop member to be moved axially in said bore to adjust said air gap and to set the limit of opening movement of said valve plunger, a cap member closing an open end of said tubular portion of said housing, a coupling means connecting said cap member and said stop member operative to prevent relative rotation between said cap member and said stop member, said coupling means comprising a stud carried by said cap member that is located within a bore formed in said stop member, and means securing said cap member to said tubular portion of said housing operative to prevent rotation of said cap member relative to said housing to thereby prevent rotation of said stop member relative to said housing.

5. The control valve according to claim 4 where said housing and cap member are both formed of plastic material and where said cap member is welded to said tubular portion of said housing.

6. The control valve according to claim 4 where said spring is a compression spring that is interposed between said valve plunger and said stop member.

* * * * *